United States Patent
Agbaria et al.

(10) Patent No.: US 8,107,451 B2
(45) Date of Patent: Jan. 31, 2012

(54) EFFICIENT DEALLOCATION OF NETWORK RESOURCES BASED ON NETWORK NODE LOCATION EXTRAPOLATION

(75) Inventors: Adnan Agbaria, Haifa (IL); Gidon Gershinsky, Haifa (IL); Nir Naaman, Haifa (IL); Konstantin Shagin, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 725 days.

(21) Appl. No.: 12/202,269

(22) Filed: Aug. 31, 2008

(65) Prior Publication Data
US 2010/0054195 A1 Mar. 4, 2010

(51) Int. Cl.
*H04W 4/00* (2009.01)
(52) U.S. Cl. ........ 370/338; 370/216; 370/329; 370/341; 370/400; 455/440; 455/441; 455/445
(58) Field of Classification Search .......... 370/216, 370/328, 329, 331, 332, 338, 341, 400, 401; 455/445, 440, 441
See application file for complete search history.

(56) References Cited

U.S. PATENT DOCUMENTS

| | | | |
|---|---|---|---|
| 7,299,038 B2 * | 11/2007 | Kennedy et al. | 455/422.1 |
| 7,330,425 B1 * | 2/2008 | Gulati et al. | 370/225 |
| 7,382,765 B2 * | 6/2008 | Kennedy et al. | 370/351 |
| 7,453,864 B2 * | 11/2008 | Kennedy et al. | 370/351 |
| 2004/0076164 A1 * | 4/2004 | Vanderveen et al. | 370/400 |
| 2004/0228304 A1 | 11/2004 | Riedel et al. | |

FOREIGN PATENT DOCUMENTS

WO WO 2007/071198 A1 6/2007

OTHER PUBLICATIONS

Zong Zhou et al., "Poster Abstract: Scalable Localization with Mobility Prediction for UnderwaterSensor Networks", 2007 Source: http://wuwnet07.engr.uconn.edu/wipposters/SLMP—2.pdf.
Location Management with Quality of Service ( QoS ) and Admission Control Source: http://www.cse.iitk.ac.in/users/dvjrao/mobilecomputingtermpaper.pdf.

* cited by examiner

*Primary Examiner* — Christopher Grey

(57) ABSTRACT

Deallocating resources allocated to a network communications session, including extrapolating an expected location of a selected node that belongs to a communications path of a network communications session, determining if the extrapolated location is beyond a predefined range from a neighboring node that belongs to the communications path of the network communications session and that immediately neighbors the selected node along the communications path, and deallocating any resources allocated to the network communications session if the extrapolated location is beyond the range.

3 Claims, 5 Drawing Sheets

EFFICIENT DEALLOCATION OF NETWORK RESOURCES BASED ON NETWORK NODE LOCATION EXTRAPOLATION

FIELD OF THE INVENTION

The present invention relates to computer networking technology in general, and more particularly to deallocating resources based on node location extrapolation in an ad-hoc computer network.

BACKGROUND OF THE INVENTION

Mobile Ad-hoc Network (MANET) technology provides a flexible method for establishing communications within a dynamic networking environment. A MANET system typically consists of wireless devices, or nodes, equipped with transmitters and receivers, and configured to implement a routing protocol. For example, a node may be a mobile device such as a Personal Digital Assistant (PDA), or laptop computer. Nodes that are within a predefined distance, or range, of each other may communicate with each other, creating an ad-hoc network. At any given time, the topology of the network may change as nodes move in and out of range of each other.

If two MANET-capable nodes, a source node and a destination node, that are not within range of each other wish to establish a communications session, a path of other MANET-capable nodes between the source and destination nodes may be found, where each node in the path is within range of its immediately neighboring nodes in the path. Additionally, in order to provide quality of service (QoS) required for the session, each node in the path typically reserves an amount of bandwidth for the session. The nodes in the network use a routing protocol to determine if they are included in any given path, which may change during a given session as the topology of the network changes. When a session is terminated by either the source or destination node, or when a node is no longer on a session path due to network topology changes, or when there is a lack of connectivity between the source and destination nodes for any other reason, the node can release the bandwidth reserved for the session so that it may be available for use by other sessions. Typically, a node determines that it may release the reserved bandwidth for a session only after a period of time, called a "timeout," has passed without receiving any communication regarding the session. As network throughput and performance are highly dependent on the bandwidth available at the nodes, any unnecessary delay in releasing the bandwidth reserved by the nodes for a given session, such as waiting for a full timeout, adversely affects the network performance.

SUMMARY OF THE INVENTION

The present invention in embodiments thereof discloses novel systems and methods for efficient deallocation of network resources based on network node location extrapolation.

In one aspect of the present invention a method is provided for deallocating resources allocated to a network communications session, the method including extrapolating an expected location of a selected node that belongs to a communications path of a network communications session, determining if the extrapolated location is beyond a predefined range from a neighboring node that belongs to the communications path of the network communications session and that immediately neighbors the selected node along the communications path, and deallocating any resources allocated to the network communications session if the extrapolated location is beyond the range.

In another aspect of the present invention if the extrapolated location is beyond the range from the neighboring node and if the extrapolated location is within a predefined distance from the neighboring node, the determining step includes sending a message to the selected node, and performing the deallocating step if no confirmation is received from the selected node within a predefined period of time from when the message is sent.

In another aspect of the present invention the performing step includes performing the deallocating when the predefined period of time is an expected round-trip-time (RTT) for messages to travel a round trip between an extrapolating node performing the extrapolating, determining, sending, and deallocating steps and the selected node given the expected location of the selected node.

In another aspect of the present invention the performing step includes performing the deallocating when the extrapolated location is beyond the range from the neighboring node and if the extrapolated location is beyond a predefined distance from the neighboring node.

In another aspect of the present invention the method further includes performing a predefined calculation to determine a probability that an extrapolating node performing the extrapolating, determining, sending, and deallocating steps belongs to a recovery path for the session, waiting a predefined period of time for the extrapolating node to receive traffic as part of the session if the probability is greater than a predefined threshold, and performing the deallocating step if the extrapolating node does not receive session traffic within the predefined time period.

In another aspect of the present invention the method further includes performing a predefined calculation to determine a probability that an extrapolating node performing the extrapolating, determining, sending, and deallocating steps belongs to a recovery path for the session, and performing the deallocating step if the probability is below a predefined threshold.

In another aspect of the present invention a computer-implemented program is provided embodied on a computer-readable medium, the computer program including a code segment operative to extrapolate an expected location of a selected node that belongs to a communications path of a network communications session, a code segment operative to determine if the extrapolated location is beyond a predefined range from a neighboring node that belongs to the communications path of the network communications session and that immediately neighbors the selected node along the communications path, and a code segment operative to deallocate any resources allocated to the network communications session if the extrapolated location is beyond the range.

BRIEF DESCRIPTION OF THE DRAWINGS

The present invention will be understood and appreciated more fully from the following detailed description taken in conjunction with the appended drawings in which.

DETAILED DESCRIPTION OF THE INVENTION

Figure 1A:
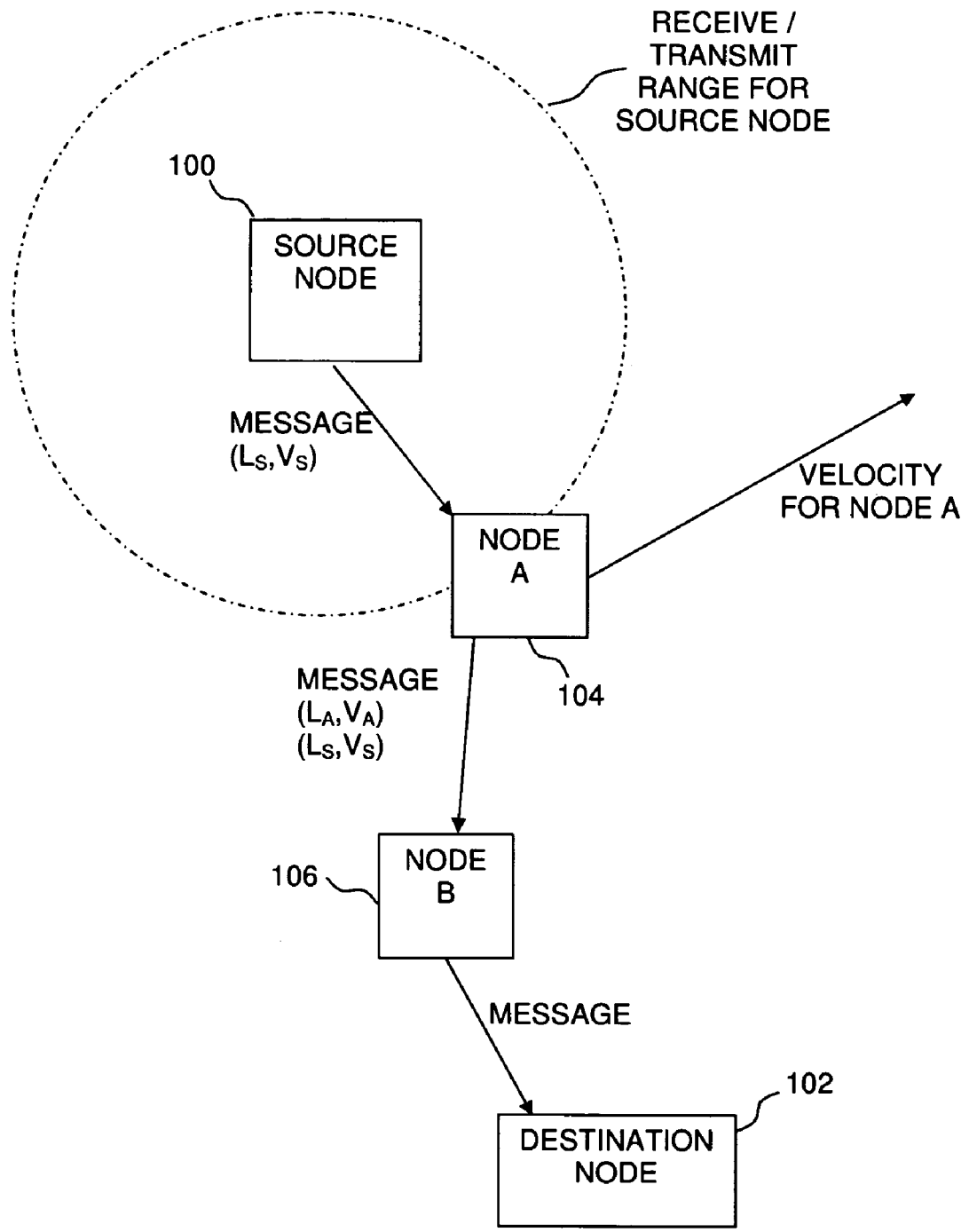
FIGS. 1A and 1B are simplified conceptual illustrations of an ad-hoc network with resource deallocation based on node location extrapolation, constructed and operative in accordance with an embodiment of the present invention.

The present invention is now described within the context of one or more embodiments, although the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Reference is now made to FIG. 1A, which is a simplified conceptual illustration of an ad-hoc network with resource deallocation based on node location extrapolation, constructed and operative in accordance with an embodiment of the present invention. In FIG. 1A a network communications session, such as may be created in a MANET network, is created between a source node 100 and a destination node 102 via one or more additional nodes, such as nodes 104 and 106, also labeled nodes A and B respectively, resulting in a communications path for the session. The nodes may be cellular telephones, personal digital assistants, or any other devices able to send and receive messages to and from other nodes within communications range as part of a network of nodes, such as a MANET network. Nodes 104 and 106 preferably reserve an amount of bandwidth for the session according to known protocols. Any, and preferably each, of the nodes in the path provides its location and velocity to any, and preferably each, of the other nodes in the path, where a node preferably determines its location and velocity using any known method. This providing of location and velocity information is preferably done periodically, such as at predefined time intervals, and/or whenever a node detects a sudden change in its location and/or velocity beyond predefined thresholds. In the example shown in FIG. 1A, node 100 sends its location and velocity information $(L_S, V_S)$ to node 104, and node 104 sends its location and velocity information $(L_A, V_A)$, as well as $(L_S, V_S)$, to Node 106.

Periodically, such as at predefined time intervals, any, and preferably each, of the nodes in the path preferably predicts if the session communications path still exists by extrapolating the expected location of any of the other nodes in the path using their location and velocity information, as well as the time that has elapsed from when the location and velocity information was received and the current time, and determining whether the extrapolated location of any of the nodes in the path is outside of the range of the known or extrapolated location of any of their immediate neighbors in the path. For example, after receiving the location and velocity information of node 100 and node 104 at a time $t_0$, node 106 may extrapolate the expected location of nodes 100 and 104 at a later time $t_1$, and determine that the extrapolated location of node 104 is no longer within range of the extrapolated location of node 100. Should any node suspect that its own location or the known or extrapolated location of any other node in the session path is out of range of a neighboring node as described above, the suspecting node preferably performs one or more predefined actions to determine whether the node may release any of the resources that the node may have allocated for the session.

Figure 1B:
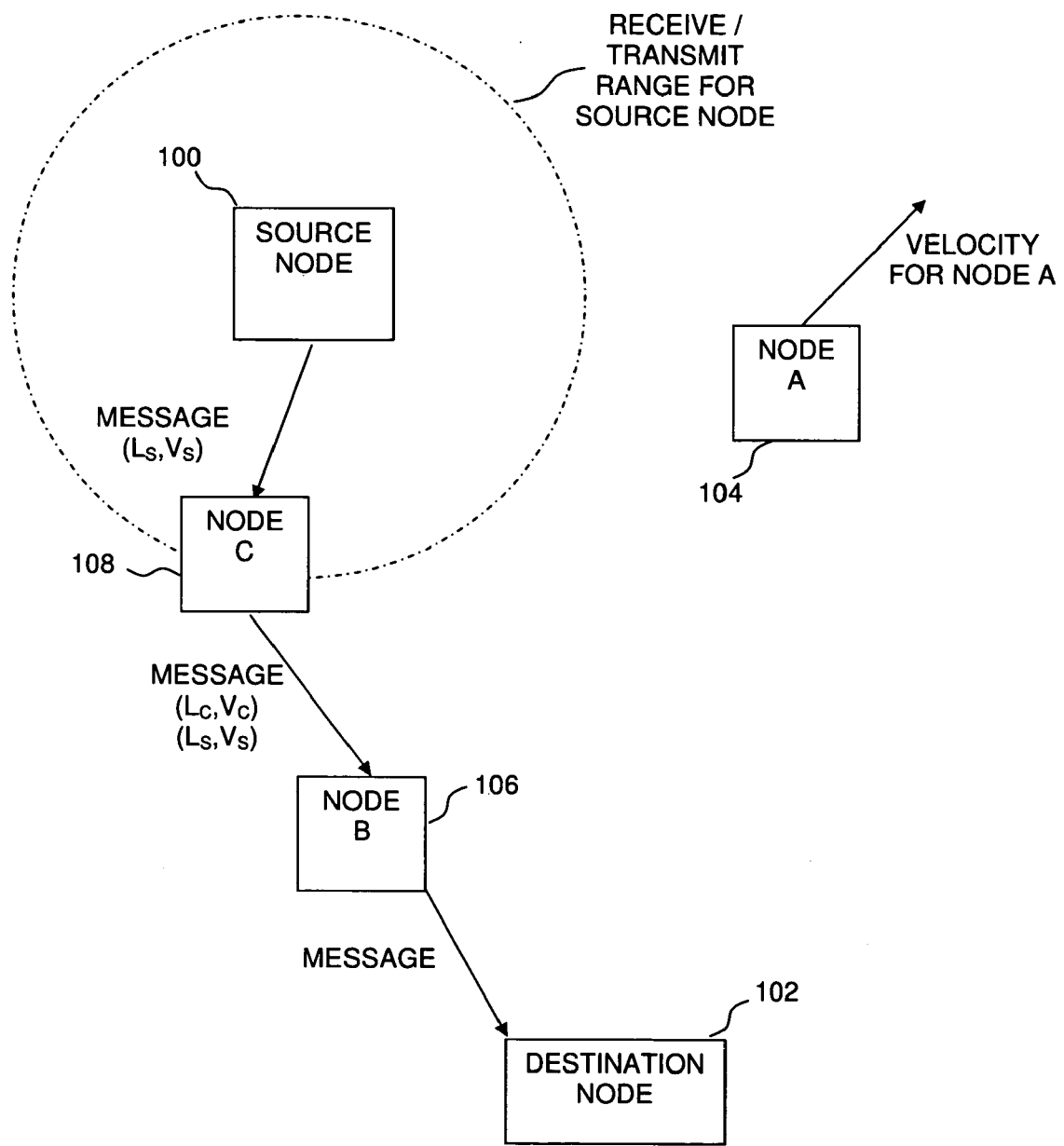

Reference is now made to FIG. 1B which is substantially similar to FIG. 1A with the notable exception that node 104 is no longer within range of node 100 or of node 106, and as a result, is no longer included in the session communications path. A new path is found for the session with node 108, also labeled node C, replacing node 104 in the path. Node 100 preferably provides its location and velocity ($L_S, V_S$) to node 108 and node 108 preferably provides its location and velocity ($L_C, V_C$), as well as ($L_S, V_S$), to node 106. Node 106 is still included in the path, and as such, continues to reserve bandwidth for the session.

Figure 2A:
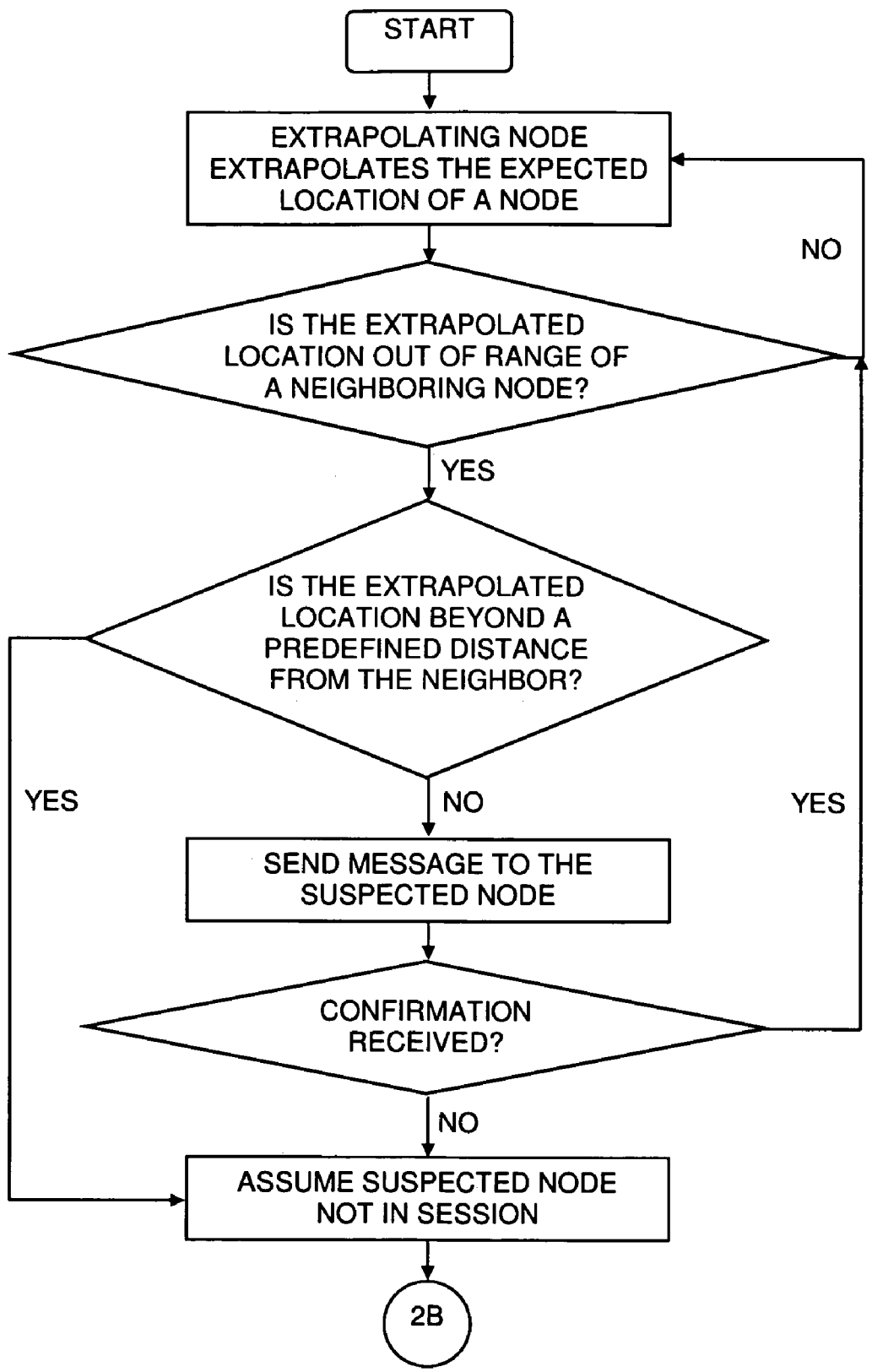
FIGS. 2A and 2B, taken together, is a simplified flowchart illustration of an exemplary method of operation of the system of FIGS. 1A and 1B operative in accordance with an embodiment of the present invention.
Figure 2B:
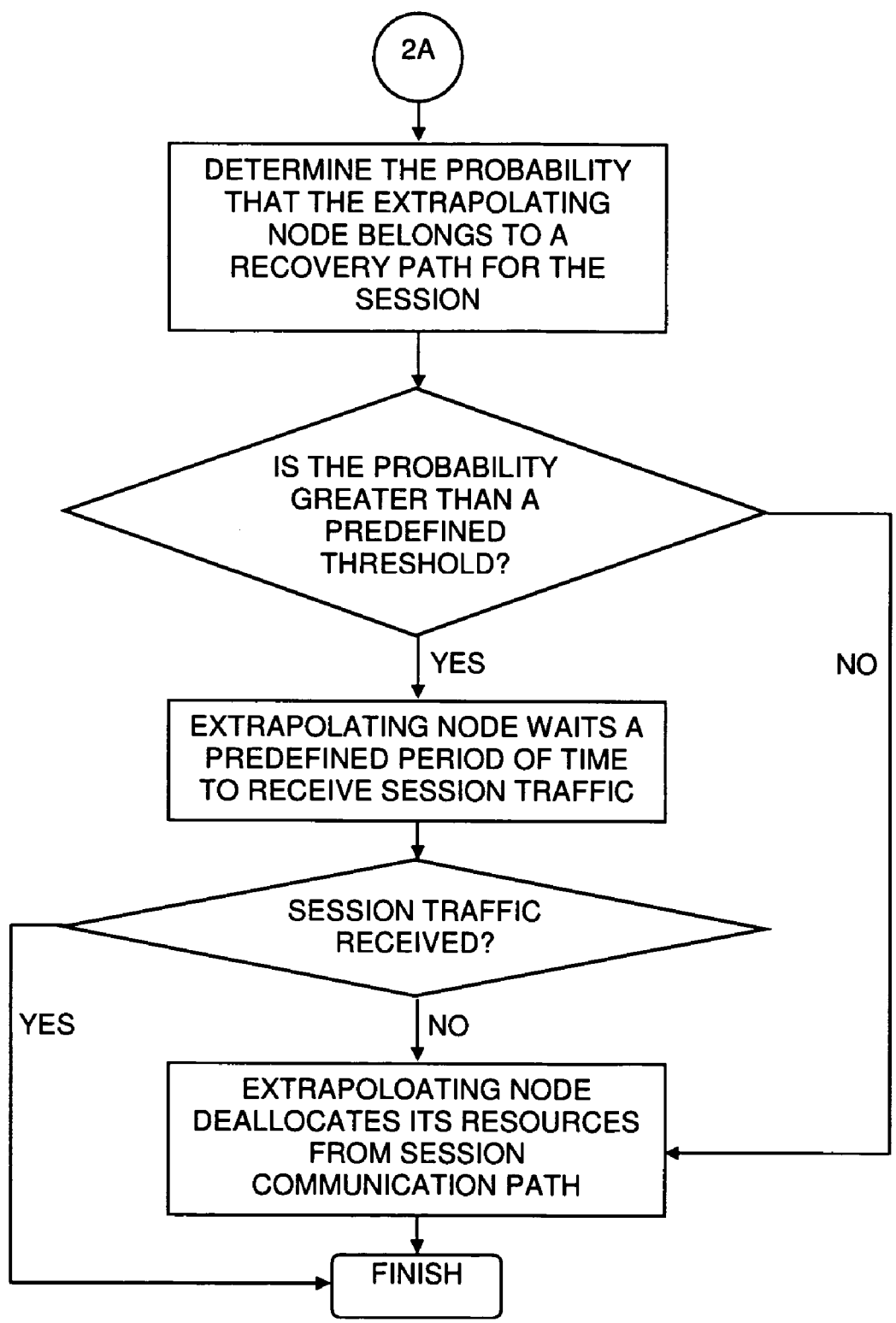

Reference is now made to FIGS. 2A and 2B, which, taken together, is a simplified flowchart illustration of an exemplary method of operation of the network of FIG. 1A as it relates to resource deallocation based on node location extrapolation, operative in accordance with an embodiment of the present invention. The method of FIGS. 2A and 2B may be performed by any, and preferably each, of the nodes that belong to a session communications path as described above, and a node that performs the method of FIGS. 2A and 2B is referred to hereinafter as an extrapolating node. In the method of FIGS. 2A and 2B an extrapolating node extrapolates the expected location of any of the nodes that both belong to the session communications path. The expected location of a selected node at a time index $t_1$ may be extrapolated if the location and velocity of the node at a time index to that precedes $t_1$ is known. If the extrapolated location of a node is such that it is out of range of the known or expected location of any of its immediately neighboring nodes along the session communications path, and therefore the node can no longer lie along the session communications path, the extrapolating node preferably does one of the following:

If the extrapolated location of the suspected out-of-range node is nevertheless within a predefined distance from its suspected out-of-range neighbor, then the extrapolating node sends a message to the suspected out-of-range node and waits a period of time to receive a confirmation from the suspected node, where the period of time is, in one embodiment, the expected round-trip-time (RTT) for messages to travel from the extrapolating node to the suspected node and back, given the expected location of the suspected node. If the confirmation is not received within the expected RTT, then the suspected node may be assumed to no longer lie along the session communications path;

Alternatively, if the extrapolated location of the suspected out-of-range node is beyond the predefined distance from its suspected out-of-range neighbor, then the extrapolating node automatically assumes that the node no longer lies along the session communications path.

Once the suspected node has been determined to no longer lie along the session communications path, then the extrapolating node preferably performs a predefined calculation to determine the probability that it belongs to a recovery path for the session. If the probability is greater than a predefined threshold, then the extrapolating node preferably waits a predefined period of time to receive traffic as part of the session. If the extrapolating node does not receive session traffic within the predefined time period, or if the probability is below the predefined threshold, then the extrapolating node preferably deallocates any of its resources, such as bandwidth, that it reserved for the session, and makes it available for other sessions.

It will be appreciated that by using the location and velocity information of the nodes in a network session communications path to determine if a node no longer belongs to the path, the nodes will be able to deallocate any reserved resources sooner than they would using session timeout-based techniques. The present invention is therefore believed to provide more efficient use of network resources, improving overall network performance.

Figure 3:
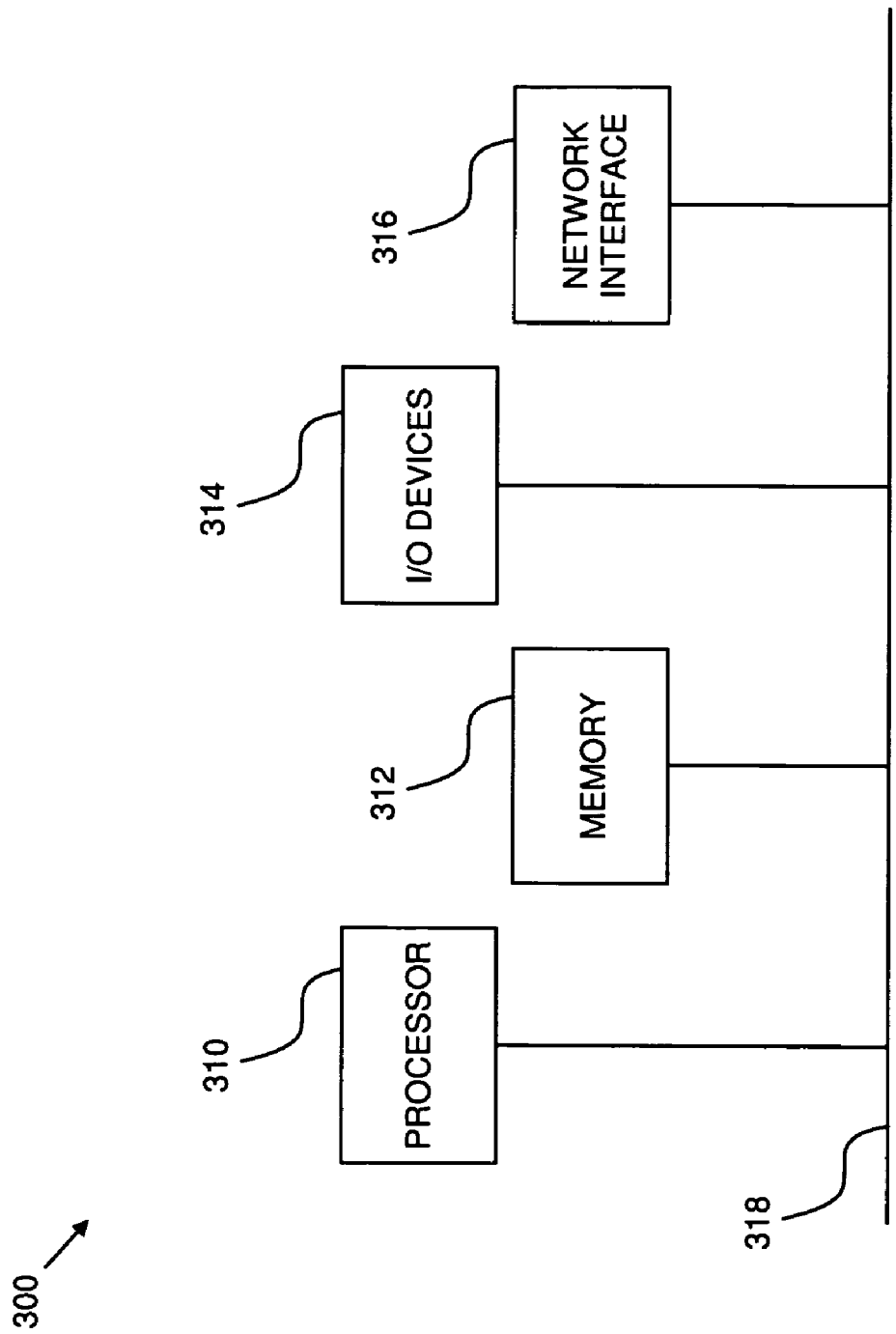
FIG. 3 is a simplified block diagram illustration of an exemplary hardware implementation of a computing system, constructed and operative in accordance with an embodiment of the present invention.

Referring now to FIG. 3, block diagram 300 illustrates an exemplary hardware implementation of a computing system in accordance with which one or more components/methodologies of the invention (e.g., components/methodologies described in the context of FIGS. 1A-2B) may be implemented, according to an embodiment of the present invention.

As shown, the techniques for controlling access to at least one resource may be implemented in accordance with a processor 310, a memory 312, I/O devices 314, and a network interface 316, coupled via a computer bus 318 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the methods and apparatus herein may or may not have been described with reference to specific computer hardware or software, it is appreciated that the methods and apparatus described herein may be readily implemented in computer hardware or software using conventional techniques.

While the present invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A system for deallocating resources allocated to a network communications session, the method comprising:
    a selected node that belongs to a communications path of a network communications session, wherein said selected node is configured to provide its location and velocity; and
    an extrapolating node that belongs to said communications path of said network communications session, and that is configured to
        receive said selected node location and velocity,
        extrapolate an expected location of said selected node,
        determine if said extrapolated location is beyond a predefined range from a neighboring node that belongs to said communications path of said network communications session and that immediately neighbors said selected node along said communications path, and
        deallocate any resources allocated to said network communications session if said extrapolated location is beyond said range,
    wherein said predefined period of time is an expected round-trip-time (RTT) for messages to travel a round trip between said extrapolating node and said selected node, and
    wherein if said extrapolated location is beyond said range from said neighboring node and if said extrapolated location is within a predefined distance from said neighboring node, said extrapolating node is configured to send a message to said selected node, and
        deallocate said resources if no confirmation is received from said selected node within a predefined period of time from when said message is sent.

2. A system for deallocating resources allocated to a network communications session, the method comprising:
    a selected node that belongs to a communications path of a network communications session, wherein said selected node is configured to provide its location and velocity; and
    an extrapolating node that belongs to said communications path of said network communications session, and that is configured to
        receive said selected node location and velocity,
        extrapolate an expected location of said selected node,
        determine if said extrapolated location is beyond a predefined range from a neighboring node that belongs to said communications path of said network communications session and that immediately neighbors said selected node along said communications path, and
        deallocate any resources allocated to said network communications session if said extrapolated location is beyond said range,
    wherein said extrapolating node is configured to
        perform a predefined calculation to determine a probability that said extrapolating node belongs to a recovery path for said session,
        wait a predefined period of time to receive traffic as part of said session if said probability is greater than a predefined threshold, and
        deallocate said resources if no session traffic is received within said predefined time period.

3. A system for deallocating resources allocated to a network communications session, the method comprising:
    a selected node that belongs to a communications path of a network communications session, wherein said selected node is configured to provide its location and velocity; and
    an extrapolating node that belongs to said communications path of said network communications session, and that is configured to
        receive said selected node location and velocity,
        extrapolate an expected location of said selected node,
        determine if said extrapolated location is beyond a predefined range from a neighboring node that belongs to said communications path of said network communications session and that immediately neighbors said selected node along said communications path, and
        deallocate any resources allocated to said network communications session if said extrapolated location is beyond said range,
    wherein said extrapolating node is configured to
        perform a predefined calculation to determine a probability that said extrapolating node belongs to a recovery path for said session, and
        deallocate said resources if said probability is below a predefined threshold.

* * * * *